United States Patent [19]
Hanif et al.

[11] Patent Number: 5,721,818
[45] Date of Patent: Feb. 24, 1998

[54] METHOD AND SYSTEM FOR ENABLING A FILE SERVER TO SERVICE MULTIPLE NETWORKS OF THE SAME NETWORK PROTOCOL FAMILY BY INVOKING MULTIPLE INSTANCES OF A NETWORK SESSION PROTOCOL

[75] Inventors: Mohammad Hanif, Fremont; Michael Vierling, San Francisco; Kazuhisa Yanagihara, Santa Cruz, all of Calif.

[73] Assignee: Apple Computer, Inc., Cupertino, Calif.

[21] Appl. No.: 591,860

[22] Filed: Jan. 25, 1996

[51] Int. Cl.[6] .......................... G06F 13/00; G06F 15/163
[52] U.S. Cl. .................. 395/200.12; 395/200.03; 395/680; 370/469
[58] Field of Search .................. 395/200.02, 200.03, 395/200.09, 200.12, 831, 500, 680, 682, 702; 370/466, 469, 903

[56] References Cited

U.S. PATENT DOCUMENTS

| | | | |
|---|---|---|---|
| 5,228,137 | 7/1993 | Kleinerman et al. | 395/500 |
| 5,280,610 | 1/1994 | Travis, Jr. et al. | 395/614 |
| 5,377,350 | 12/1994 | Skinner | 395/683 |
| 5,414,812 | 5/1995 | Filip et al. | 395/614 |
| 5,485,460 | 1/1996 | Schrier et al. | 370/389 |
| 5,515,508 | 5/1996 | Pettus et al. | 395/200.01 |

OTHER PUBLICATIONS

Inside AppleTalk; G. Sidhu et al., Addision–Wesley, 2nd Ed. 1990; p. 2–3, fig. 2–1.

*Primary Examiner*—Parshotam S. Lall
*Assistant Examiner*—Viet Vu
*Attorney, Agent, or Firm*—Sawyer & Associates

[57] ABSTRACT

A system and method for enabling a file server to service a plurality of physical networks, wherein each of the networks has a network protocol of the same type. The system and method comprises a single instance of a filing protocol, and an object-oriented class for implementing a session protocol. The system and method further comprises means for invoking a plurality of session protocol instances, where each one of the plurality of session protocol instances corresponds to one of the plurality of physical networks. Each one of the plurality of session protocol instances services the corresponding physical network and communicates with the single instance of the filing protocol, which enables the single instance of the filing protocol to service the plurality of physical networks.

19 Claims, 6 Drawing Sheets

METHOD AND SYSTEM FOR ENABLING A FILE SERVER TO SERVICE MULTIPLE NETWORKS OF THE SAME NETWORK PROTOCOL FAMILY BY INVOKING MULTIPLE INSTANCES OF A NETWORK SESSION PROTOCOL

FIELD OF THE INVENTION

The present invention relates generally to an apparatus and method for transferring data between a file server and a plurality of data processing devices. More particularly, the invention relates to implementing multiple instances of a protocol stack in a file server to enable a file server to service more than one network of the same type.

BACKGROUND OF THE INVENTION

In the computing industry, it is quite common to transfer data and commands between a plurality of data processing devices, such as computers, printers, displays, terminals, and other network resources. Interconnection of computers and other peripheral devices principally developed in the early 1970's with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the AppleTalk (R) (a trademark of Apple Computer, Inc.) network system, each "node" or computer, printer, peripheral, and other network resources share resources with a file server. The file server includes three main AppleTalk protocols called the AppleTalk Filing Protocol (AFP), AppleTalk Session Protocol (ASP), and the operating system of the file server includes the AppleTalk Transaction Protocol (ATP). The AFP is a protocol dealing with issues that are file system related. The AFP uses the ASP to receive file system requests from network entities and to send responses back to the entities. The request and responses may be partitioned into smaller data packets and the ASP uses the ATP to send and receive these data packets over the network.

The ASP is a protocol for maintaining network sessions between the file server and the network entities. A session is opened once an entity establishes communication with the server. The ASP keeps information about the entity in a session object.

In a networking system, the execution of a single instance of a protocol family, such as AppleTalk, in the file server is referred to as a protocol stack. Several protocol stacks corresponding to different types of protocol families may be used simultaneously in some file servers. However, a conventional file server is limited to invoking only one protocol stack corresponding to a specific type of network. Therefore, the file server is limited to servicing only one network that has a particular network protocol. Accordingly, what is needed is a file server that can service more than one network of the same type. The present invention addresses such a need.

SUMMARY OF THE INVENTION

The present invention provides a system and method for enabling a file server to service a plurality of physical networks, wherein each of the networks has a network protocol of the same type. The system and method comprises a single instance of a filing protocol, and an object-oriented class for implementing a session protocol. The system and method further comprises means for invoking a plurality of session protocol instances, where each one of the plurality of session protocol instances corresponds to one of the plurality of physical networks. Each one of the plurality of session protocol instances services the corresponding physical network and communicates with the single instance of the filing protocol, which enables the single instance of the filing protocol to service the plurality of physical networks.

According to the system and method disclosed herein, the file server increases the number of network entities that can be serviced by the file server by increasing the number of networks.

DESCRIPTION OF THE INVENTION

The present invention relates to an improvement in a server utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
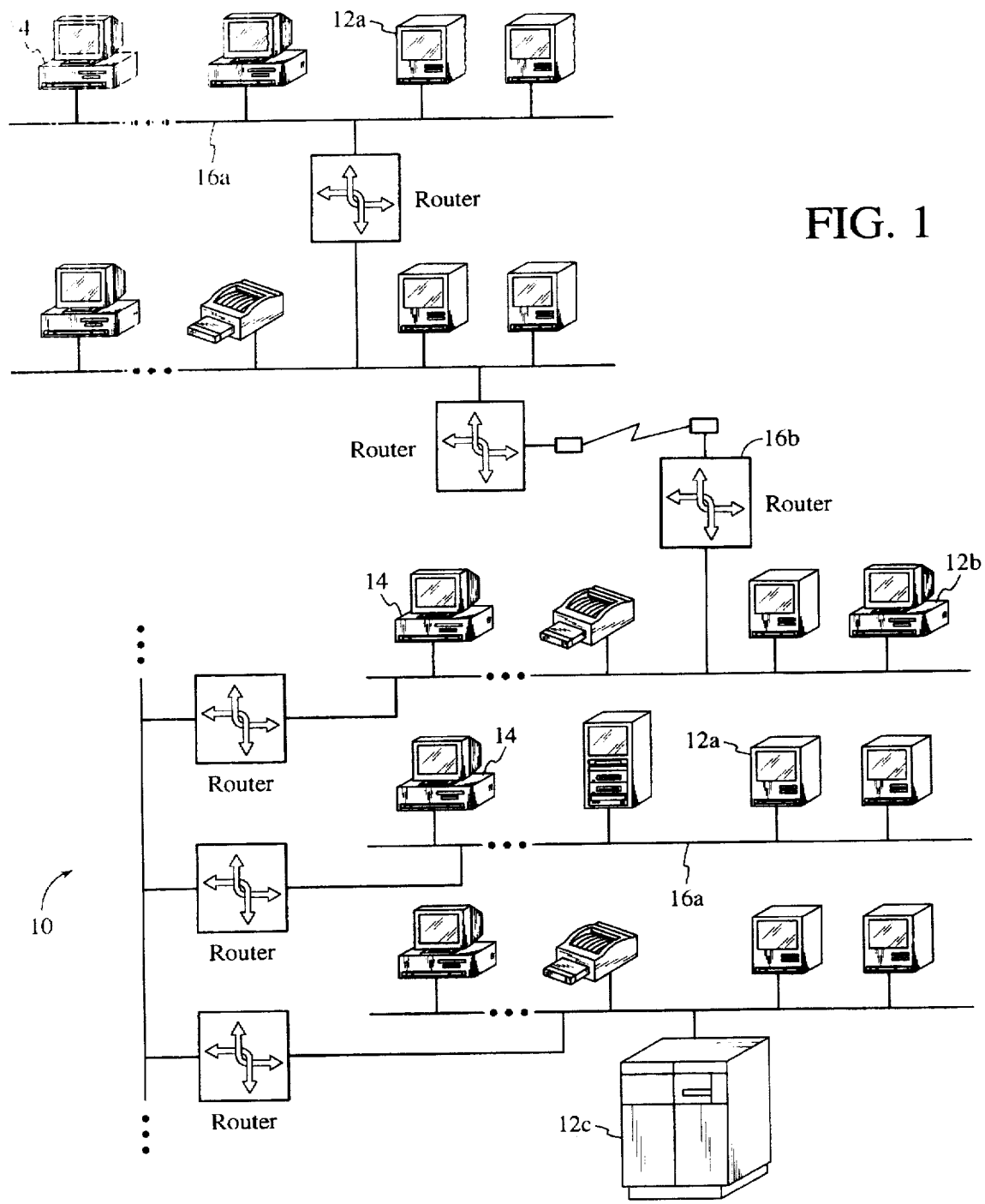
FIG. 1 is a block diagram illustrating a computer network system.

FIG. 1 is a block diagram illustrating a computer network environment in which the present invention resides. The network 10 may include a plurality of computers, such as personal computers 12a, minicomputers 12b, and mainframes 12c, and server devices 14, such as a file and printer servers. For the purposes of this specification, all data processing and peripheral devices which are coupled to the network are collectively referred to as entities 12. The entities 12 may be connected through a variety of network connection devices 16 such as cables 16a and routers 16b, for example. The purpose of the network 10 is to eliminate access barriers resulting from physical separation between the various entities 12 and to share the resources the entities 12 contain.

Figure 2:
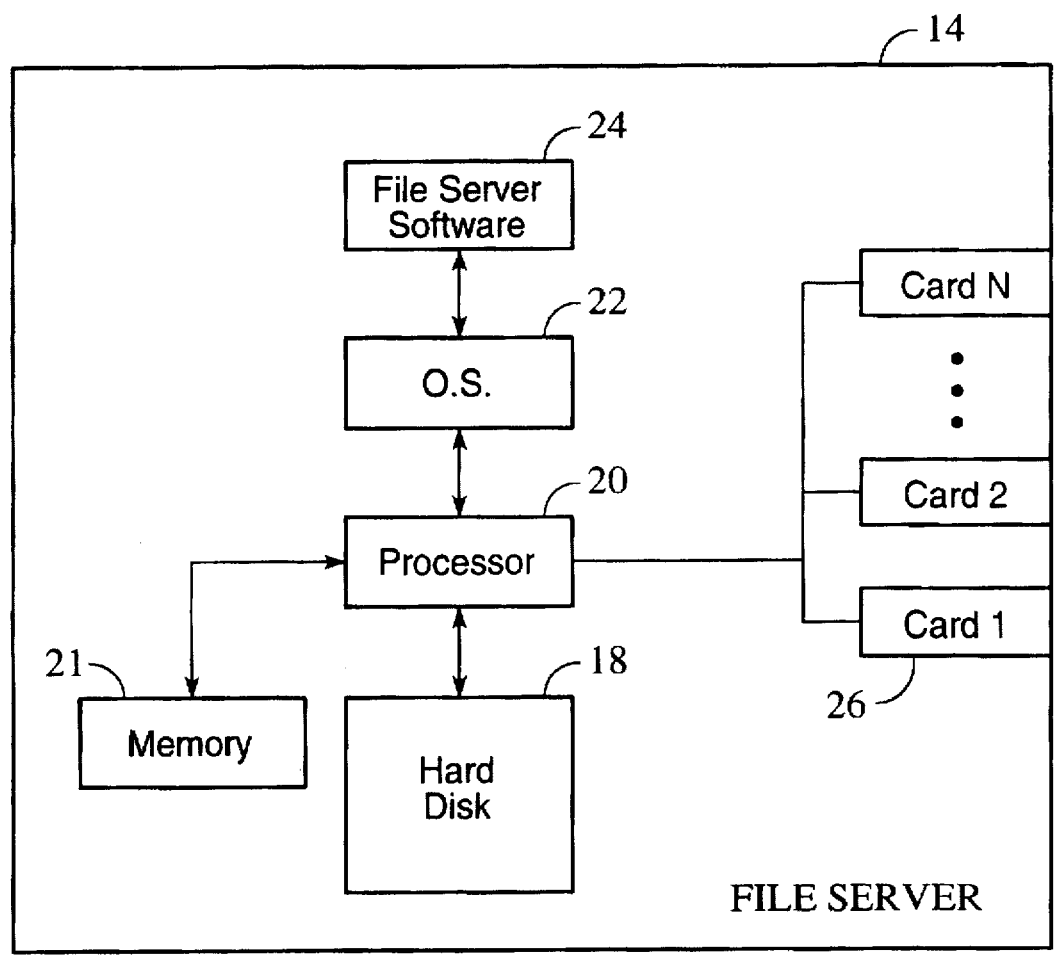
FIG. 2 is a block diagram of a server in which the present invention is implemented.

FIG. 2 is a block diagram of a server 14 in which the present invention is implemented. The server includes one or more hard disk drives 18, a processor 20, memory 21, an operating system 22, file server software 24, and one or more network interface cards 26. The file server software 24 enables a computer to become a file server 14 for one or more entities 12, on the network.

In a preferred embodiment, the file server software 24 is Appleshare File Server software, which utilizes a protocol architecture called AppleTalk. Both Appleshare and AppleTalk were designed and developed by Apple Computer, Cupertino, Calif. Also in a preferred embodiment, the processor 20 is a PowerPC processor, and the operating system 22 is a Macintosh Operating System, such as System 7.5, for example.

Figure 3:
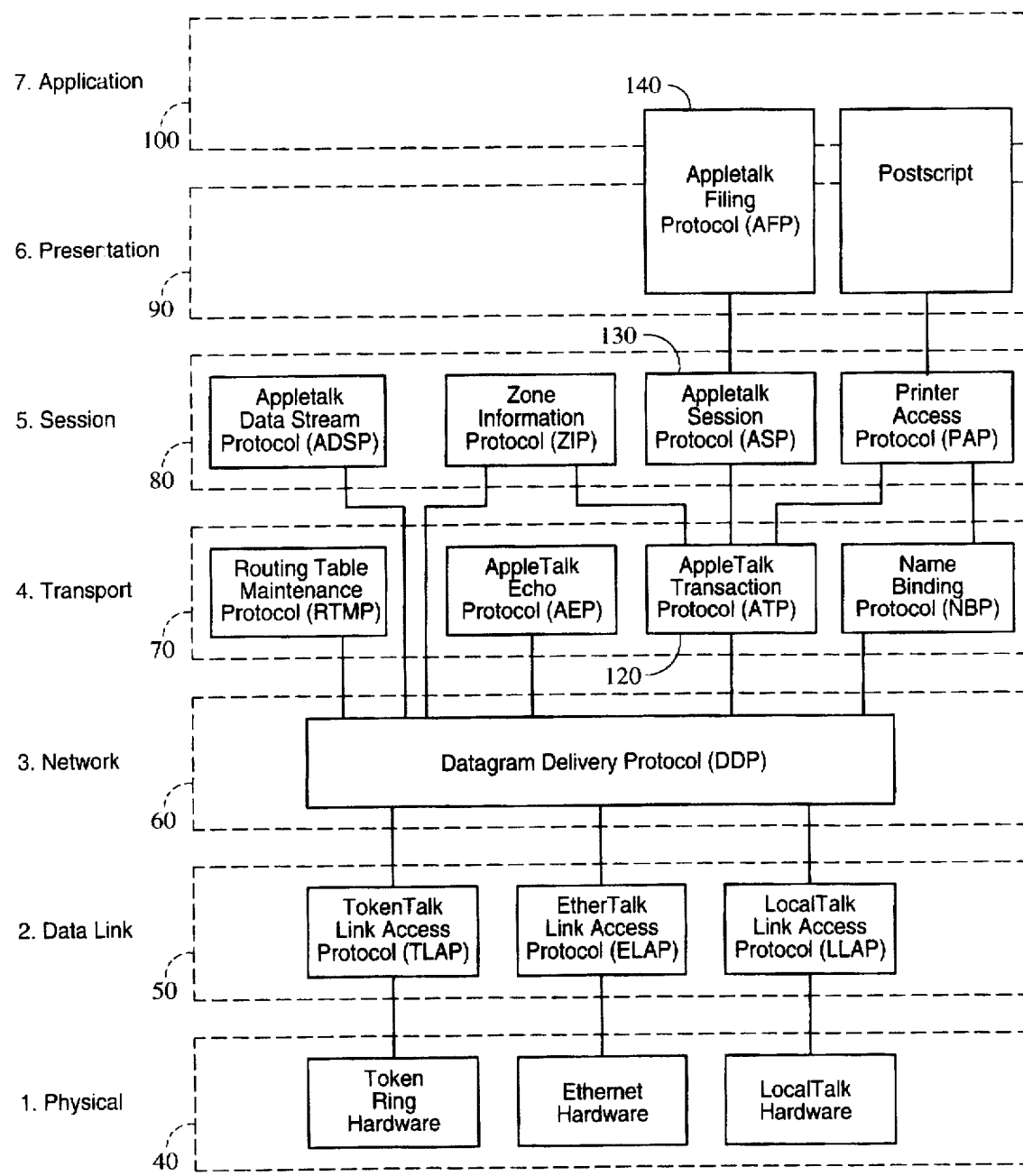
FIG. 3 is a diagram illustrating the AppleTalk protocol architecture within the framework of the Open Systems Interconnection (OSI) reference model.

Referring to FIG. 3, the AppleTalk protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and AppleTalk are built using the model of an entity 12 issuing a sequence of commands to a server 14. The server 14 carries out the commands and then reports the results to the entity 12. The present invention relates to the interaction between the AppleTalk Session Protocol (ASP) 130 and the AppleTalk Filing Protocol (AFP) 140. The AppleTalk protocol is described in further detail in *Inside AppleTalk* (R), by Gursharan Sidhu, Richard F. Andrews, and Alan B. Oppenheimer (2d Ed. 1990), published by Addision-Wesley, which is herein incorporated by reference.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The AppleTalk Transaction Protocol (ATP) 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client of ATP.

In order to send and receive transactions, a client must first create an addressable entity on the network called a socket. This is accomplished by both the requesting client and the responding server making a call to the ATP 120 to open a respective socket. The socket opened at the responding entity it called a transaction listening socket. Both the requesting client and the responding server can have multiple sockets for receiving/transmitting transactions, where each socket is identified by a socket number.

The requesting client initiates a transaction by issuing a call to the ATP 120 and supplying the parameters of the request. Once the transaction request packet is received by the socket of the responding server, the transaction request is serviced and the responding server returns a transaction response packet reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12.

The collection of all the protocols in the upper-five layers of the OSI model in a particular protocol architecture, such as AppleTalk, is referred to as a protocol family. The implementation of a single instance of a protocol family within a given entity 12 is known as a protocol stack.

Figure 4:
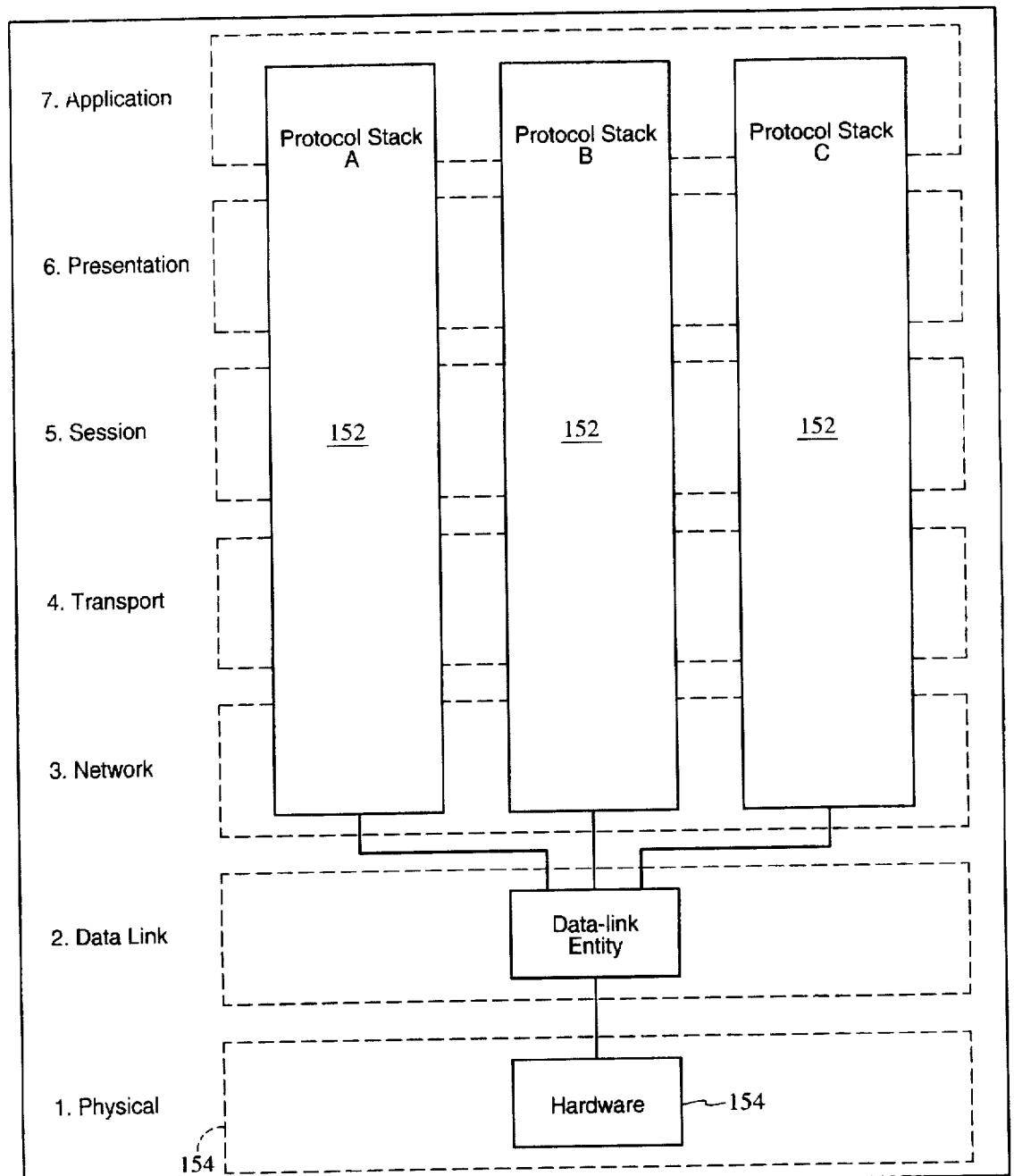
FIG. 4 is a diagram illustrating a conventional network entity in which several protocol stacks corresponding to different protocol families are in simultaneous use.

Referring to FIG. 4, a conventional network entity 150 is shown in which several protocol stacks 152 corresponding to different protocol families are in simultaneous use. For example, Protocol stack A may correspond to AppleTalk, Protocol stack B may correspond to TCP/IP, and Protocol stack C may correspond to XNS. Each protocol stack corresponding to different protocol families allows the entity 150 to provide and receive network service for the corresponding network protocol.

The entity 150 includes a single network interface card 154, and the packets of the different protocol families running within the entity 150 are all sent through this same card 154. Each of the protocol stacks 152 must use its own addressing scheme to specify the address of the node. The node address used by one protocol family are usually not intelligible to any of the other families.

Although the entity 150 can simultaneously implement a different protocol stack 152 for different types of protocol families, the entity 150 can not implement multiple protocol stacks 152 for the same type of protocol family. Thus, assuming the entity 150 was a file server, the file server could not service more than one network of the same type because the file server is limited to a single protocol stack for a particular network protocol. Even if an attempt is made to connect the fie server to a second network having the same network protocol through a second network card, the file server could service only one of the networks at any given time due to the single protocol stack limitation.

The present invention is a method and system that enables a file server to implement more than one protocol stack for a protocol family, which allows the file server 14 to service more than one network of the same type. To more particularly illustrate the present invention, refer now to FIG. 5 depicting a block diagram of one embodiment of such a system.

Figure 5:
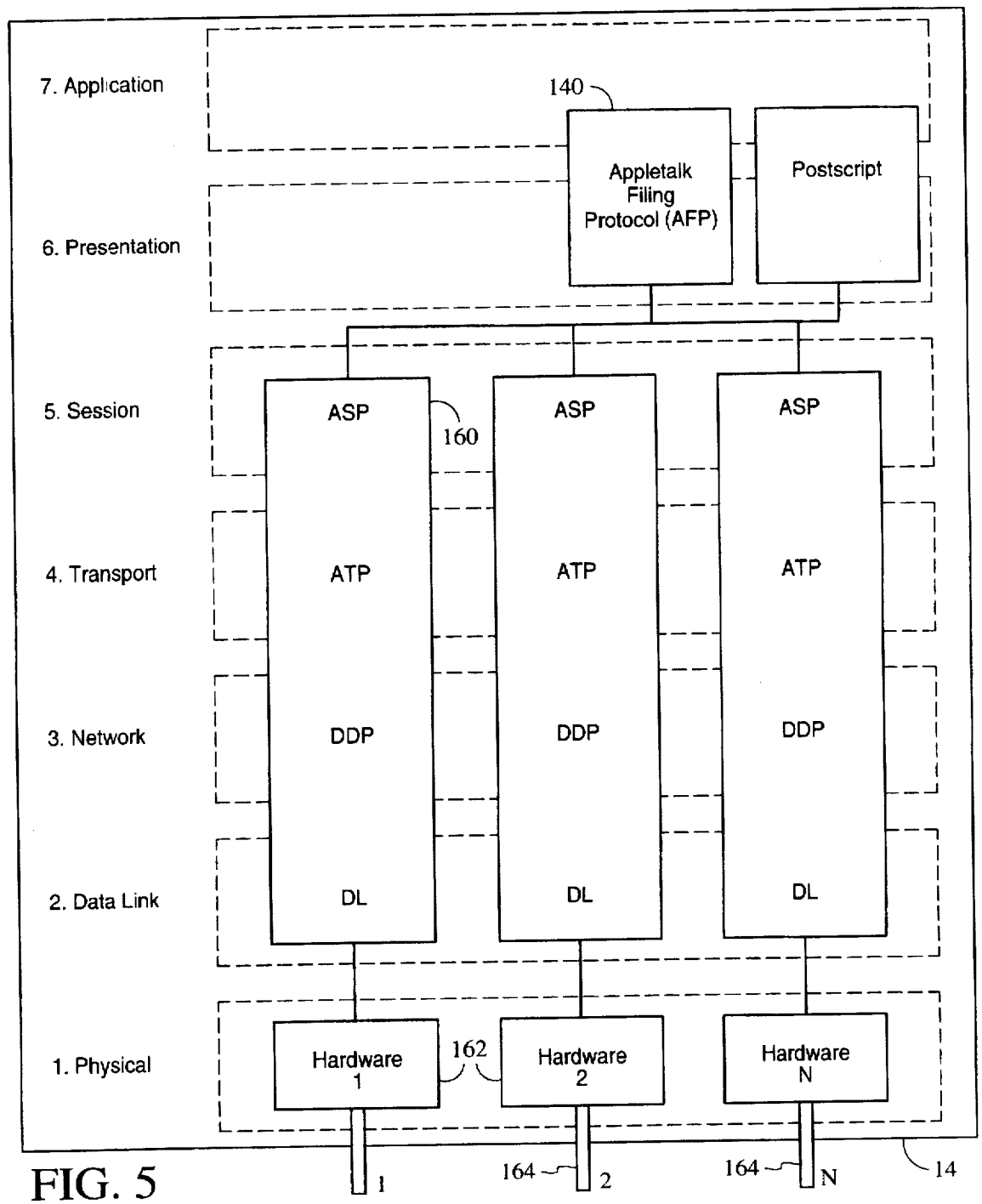
FIG. 5 is block diagram depicting the file server in which multiple protocol stacks corresponding to the same protocol family (AppleTalk) are in simultaneous use in accordance with the present invention.

FIG. 5 is block diagram depicting the file server 14 in which multiple protocol stacks 160 corresponding to the same protocol family (AppleTalk) are in simultaneous use in accordance with the present invention. As shown, the file server 14 includes N number of network cards 162, which in a preferred embodiment, are used to connect to N physically separate AppleTalk networks 164. According to the present invention, the multiple protocol stacks 160 enable the file server 14 to increase the number of network entities that can be serviced on the same type of physical network.

More specifically, the present invention implements one instance of AFP 140, while implementing multiple instances of a protocol stack 160 that begins with ASP 130. Each instance of the protocol stack 160 services a different AppleTalk network 164.

The process of implementing multiple instances of the protocol stack 160 within the file server 14 is called multihoming. Multihoming may be enabled or disabled by a user through an administration tool provided by the file server software 24 (FIG. 2). The software enables a user to enter preferences for a variety of file server settings. These settings, such as the one for multihoming, are then stored in a preference file.

The protocol layers in the AppleTalk protocol family are each written as object oriented class structures in the C++ programming language. As is apparent to one with ordinary skill in the art, a class is an abstract description of both data and behavior of a collection of similar objects.

Figure 6:
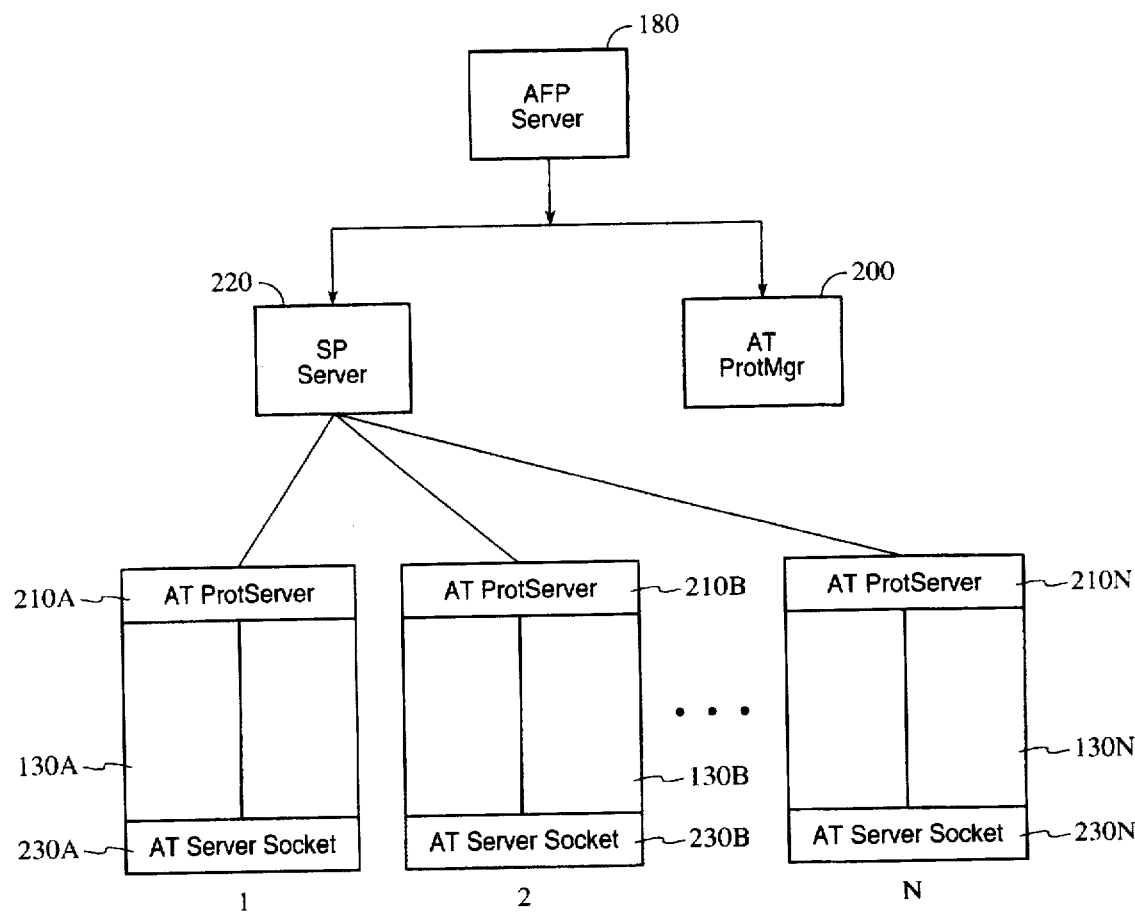
FIG. 6 is a functional block diagram illustrating object oriented class structures that are used to implement the present invention.

Referring to FIG. 6, a functional block diagram is shown that illustrates the class structures used to implement the present invention. In a preferred embodiment of the present invention, the file server utilizes the following class structures: AFPSERVER 180, ATPROTMGR 200, ATPROTSERVER 210, and SPSERVER 220.

Referring to FIGS. 5 and 6, upon start-up, the file server 14 reads the settings in the preference file. If multihoming is enabled, then AFPSERVER 180, which is a class in the AFP 140, calls ATPROTMGR 200. ATPROTMGR 200 is the class that invokes other protocol classes when certain conditions are met. In response to the call from AFPSERVER 180, ATPROTMGR 200 invokes an instance of ASP 130 for each network interface card 162 detected. A separate protocol stack 160 is created with each instance of ASP 130. Each instance of ASP 130 includes a subclass called ATServerSocket 230, which provides an instance of ASP 130 all the functions necessary to send, receive, and process requests. After the instances of ASP 130 are created, each instance of ASP 130 then communicates with the single instance of AFP 140 through the SPSERVER 220 class, as described above.

Accordingly, a method and system has been disclosed for implementing multiple instances of a protocol stack in a file server that enables the file server to service more than one network of the same type. One with ordinary skill in the art will recognize that the present invention is not limited to the AppleTalk protocol or the Macintosh file system, but rather can be implemented with any type of network protocol and any type of file system. Software written according to the present invention is intended to reside in some form of computer readable medium, such as memory or disk or communicated via a network.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

We claim:

1. A file server capable of servicing a plurality of physical networks of the same network protocol family, the file server comprising:

a single instance of a filing protocol; and means for invoking a plurality of second protocol instances, each one of the plurality of second protocol instances corresponding to one of the plurality of physical networks, wherein each one of the plurality of second protocol instances services the corresponding physical network and communicates with a single instance of the fling protocol, which enables the single instance of the filing protocol to service the plurality of networks, wherein the second protocol is a session protocol.

2. A file server as in claim 1 wherein each one of the plurality of second protocol instances creates a corresponding protocol stack.

3. A file server as in claim 2 wherein the session protocol is an object-oriented class structure.

4. A file server as in claim 3 wherein the file server further includes a plurality of network interface cards to connect to the plurality of physical networks.

5. A file server as in claim 4 wherein the network protocol comprises an AppleTalk protocol.

6. A file server as in claim 5 wherein the filing protocol comprises AppleTalk filing protocol (AFP).

7. A file server as in claim 6 wherein the session protocol comprises AppleTalk session protocol (ASP).

8. A method for enabling a file server to service a plurality of physical networks of the same network protocol family, the method comprising the steps of:

(a) invoking a single instance of a filing protocol;

(b) invoking multiple session protocol instances corresponding to each one of the plurality of physical networks using an object-oriented class structure;

(c) servicing each one of the plurality of physical networks with the corresponding session protocol instance;

(d) communicating between each one of the plurality of physical networks and the single instance of the filing protocol through the multiple session protocol instances.

9. The method as in claim 8 wherein step (a) further includes the step of:

(a1) implementing the single instance of the filing protocol through a first object oriented class structure.

10. The method of claim 9 wherein step (b) further includes the step of:

(b1) implementing the multiple session protocol instances through a second object oriented class structure.

11. The method of claim 10 wherein step (b) further includes the step of:

(b2) calling a manager class structure to invoke the multiple instances of the session protocol.

12. The method of claim 11 wherein step (b) further includes the step of:

(b3) creating a separate protocol stack corresponding to the multiple session protocol instances.

13. The method of claim 12 wherein step (d) further includes the step of:

(d1) communicating between the single instance of the filing protocol and the multiple session protocol instances through a third object oriented class structure.

14. A computer-readable medium containing program instructions for enabling a file server to service a plurality of physical networks of the same network protocol family, the program instructions for:

(a) invoking a single instance of a filing protocol;

(b) invoking multiple session protocol instances corresponding to each one of the plurality of physical networks using an object-oriented class structure;

(c) servicing each one of the plurality of physical networks with the corresponding session protocol instance;

(d) communicating between each one of the plurality of physical networks and the single instance of the fling protocol through the multiple session protocol instances.

15. A computer-readable medium as in claim 14 wherein instruction (a) further includes an instruction for:

(a1) implementing the single instance of the filing protocol through a first object oriented class structure.

16. A computer-readable medium as in claim 15 wherein instruction (b) further includes an instruction for:

(b1) implementing the multiple session protocol instances through a second object oriented class structure.

17. A computer-readable medium as in claim 16 wherein instruction (b) further includes an instruction for:

(b2) calling a manager class structure to invoke the multiple instances of the session protocol.

18. A computer-readable medium as in claim 17 wherein instruction (b) further includes an instruction for:

(b3) creating a separate protocol stack corresponding to the multiple session protocol instances.

19. A computer-readable medium as in claim 18 wherein instruction (d) further includes an instruction for:

(d1) communicating between the single instance of the filing protocol and the multiple session protocol instances through a third object oriented class structure.

* * * * *